United States Patent [19]

Schnaibel et al.

[11] 4,417,688

[45] Nov. 29, 1983

[54] TEMPERATURE CONTROL SYSTEM FOR VEHICLE PASSENGER COMPARTMENT

[75] Inventors: Eberhard Schnaibel, Hemmingen; Erich Junginger, Stuttgart, both of Fed. Rep. of Germany

[73] Assignee: Robert Bosch GmbH, Stuttgart, Fed. Rep. of Germany

[21] Appl. No.: 344,772

[22] Filed: Feb. 1, 1982

Related U.S. Application Data

[63] Continuation-in-part of Ser. No. 78,594, Sep. 24, 1979, abandoned.

[30] Foreign Application Priority Data

Nov. 14, 1978 [DE] Fed. Rep. of Germany ....... 2849275

[51] Int. Cl.³ .............................................. G05D 23/00
[52] U.S. Cl. ................................ 236/91 F; 237/2 A; 236/10; 165/39
[58] Field of Search ................. 236/91 F, 10, 54, 55; 237/12.3 B, 12.3 A, 2 A; 165/39

[56] References Cited

U.S. PATENT DOCUMENTS 4,189,093  2/1980  Schnaibel et al. ................ 236/91 F Primary Examiner—Albert J. Makay
Assistant Examiner—Henry Bennett
Attorney, Agent, or Firm—Michael J. Striker

[57] ABSTRACT

The heat exchanger of the temperature control system for a vehicle passenger compartment exchanges heat with air entering the passenger compartment. The flow of heat-exchange medium through the heat exchanger is controllable for controlling passenger-compartment temperature. A servo comparator receives and compares a temperature command signal and a feedback signal and produces an error signal which operates an actuator which in turn actuates an adjuster for fluid flow through the heat exchanger. The command signal is derived from a command transducer whose setting is adjustable by a passenger. The feedback signal is derived from a passenger-compartment temperature sensor but additionally, in order to avoid system instability, is furthermore derived from a heat-exchanger temperature sensor. In particular, the feedback signal includes a component whose value is determined by the rate of change with respect to time of the temperature sensed by the heat-exchanger temperature sensor. In this way, when a steady-state condition is achieved and the rate of change of the temperature of the heat-exchanger becomes zero, the steady-state response of the system depends substantially exclusively upon the temperature sensed by the passenger-compartment temperature sensor.

11 Claims, 3 Drawing Figures

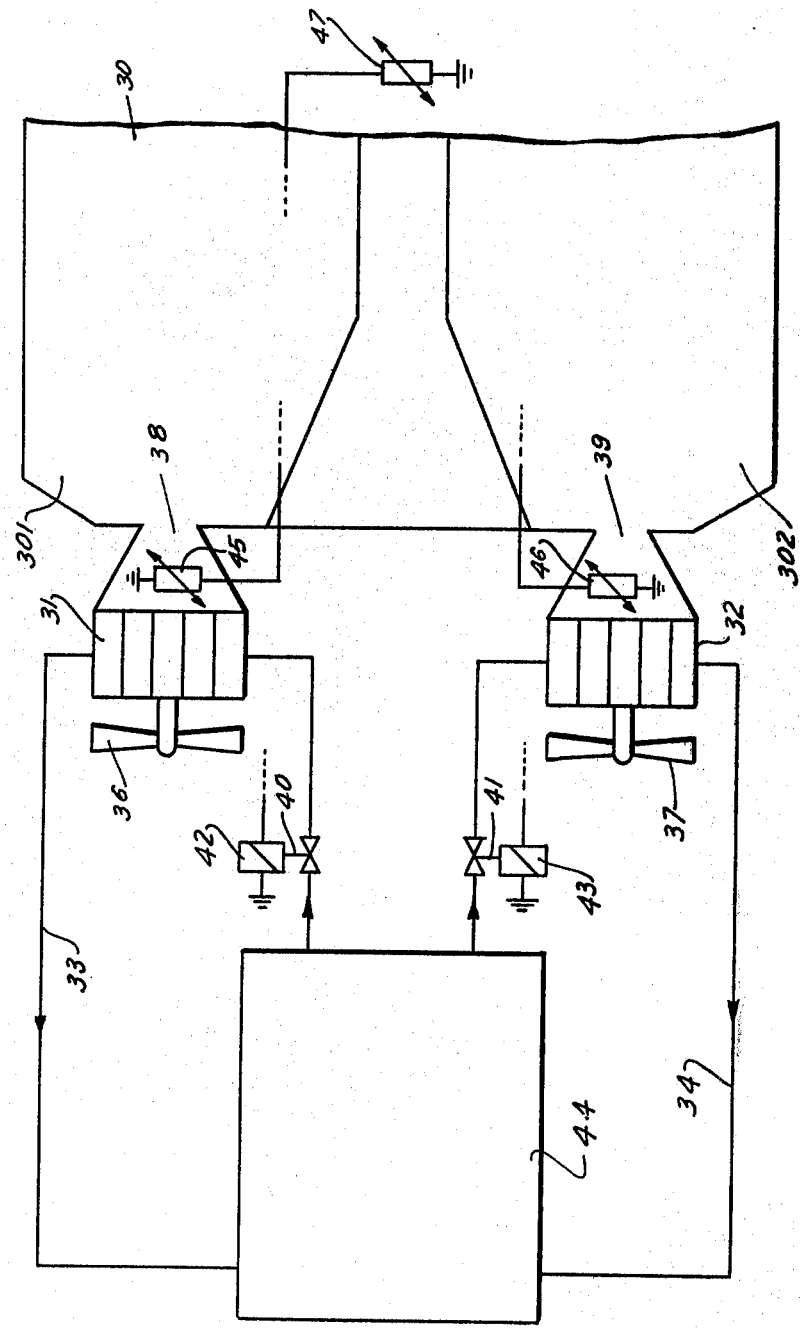

TEMPERATURE CONTROL SYSTEM FOR VEHICLE PASSENGER COMPARTMENT

CROSS-REFERENCE TO RELATED APPLICATIONS

This application is a continuation-in-part application of application filed Sept. 24, 1979 and bearing Ser. No. 78,594 now abandon. The entire disclosure of this latter application, including the drawings thereof, is hereby incorporated in this application as if fully set forth herein.

BACKGROUND OF THE INVENTION

The present invention concerns temperature control systems which control the air temperature inside vehicle passenger compartments, most typically automotive vehicle passenger compartments. Typically, such temperature control systems operate on the basis of negative-feedback control action and include a command transducer which is adjusted by a passenger or driver to select a desired temperature, a passenger-compartment temperature sensor which senses the temperature inside the passenger compartment, and also a heat-exchanger temperature sensor which senses the temperature at or near the surface of a heat exchanger through which heat-exchange fluid flows for heating or cooling the air entering the passenger compartment. In such systems, the signal from the command transducer is compared with the feedback signal developed from the two differently located temperature sensors, and in dependence upon the discrepancy between the two signals the heat-exchanging action of the heat exchanger is automatically adjusted.

In the prior art, the feedback signal developed from the passenger-compartment temperature sensor and the heat-exchanger temperature sensor is made mainly dependent upon the signal from the passenger-compartment temperature sensor and less dependent upon the signal from the heat-exchanger exchanger temperature sensor. For example, the signals from the two temperature sensors may be algebraically summed with different respective weighing factors, to produce the actual feedback signal of the temperature control system. Conventionally, the dependence of the system feedback signal on the passenger-compartment temperature signal is five to eight times as great as its dependence on the heat-exchanger temperature signal. This difference in weighting factors is important for the stability of the negative-feedback temperature control system. If the weighting factor applied to the signal from the heat-exchanger temperature sensor is made too low, or if no heat-exchanger temprature sensor is used at all, then system operation dependent upon the passenger-commpartment temperature sensor alone exhibits periodic departures from the commanded temperature, these departures being of considerable magnitude.

On the other hand, the effect upon the system feedback signal of the heat-exchanger temperature signal leads to steady-state error in system performance, such steady state error becoming of unacceptably great magnitude, for example, in the case of heating systems used in winter where a high temperature is necessary for the heat exchanger. Because in extreme cold the heat-exchanger temperature must be made quite high to implement a comfortable passenger-compartment temperature, the contribution of the heat-exchanger temperature signal to the system's feedback signal tends to produce a disproportionately great increase in the system's feedback signal. I.e., the high temperature of the heat exchanger is, so to speak, confused with the passenger-compartment temperature, with the result being a passenger-compartment temperature considerably lower than actually commanded by the driver or passenger.

This can be explained with regard to a numerical example. In summer the typical temperature of the heat exchanger will be ca. 20° C. In contrast, in winter the heat-exchanger surface temperature will be ca. 60° C. Assume that the system's temperature feedback signal corresponds to the sum of the sensed passenger-compartment temperature and one-fifth the sensed heat-exchanger temperature. Accordingly, a 1° C. rise in the temperature sensed by the passenger-compartment sensor increases the system's feedback signal by five times the amount which would result from a 1° C. rise in the temperature of the system's heat exchanger. If now the temperature of the heat exchanger changes from 20° C. to 60° C., i.e., a rise of 40° C., the effect upon the system's feedback signal is the same as that of 8° C. rise in the interior temperature of the passenger compartment. Thus, as between the two heat-exchanger temperatures, and assuming the selected temperature to be the same in both cases, the system's feedback signal tends to simulate a passenger-compartment temperature increase of 8° C. If during summer operation, i.e., with the heat-exchanger temperature at 20° C., the system is so designed that the selected temperature is accurately implemented by the system, then during winter operation, i.e., with the heat-exchanger temperature of 60° C., and assuming the same interior temperature to have been selected, the system will develop a steady-state error of about 8° C. Furthermore, The amount of the steady-state error increases with increases of selected temperature.

This low accuracy of such passenger-compartment temperature control system is less than satisfactory, and quite unsatisfactory in the case of vehicles destined for localities having extremes of temperature, e.g., very hot days and very cold nights. Moreover, and as explained above, it is not appropriate to eliminate the accuracy-reducing effect of the heat-exchanger temperature sensor by eliminating the sensor itself, because the result is then unstable system behavior.

SUMMARY OF THE INVENTION

It is a general object of the invention to provide a considerably more accurate temperature control system of the type discussed above.

In accordance with the present invention, the heat-exchanger temperature sensor is coupled to the servo comparator of the temperature control system by means operative for transmitting to the servo comparator a signal dependent upon the rate of change of the heat-exchange temperature with respect to time.

In this way, the temperature feedback signal of the system is made dependent upon the heat-exchanger temperature signal during the transient response of the system. However, by the time the system has developed a steady-state response, the effect of the heat-exchanger temperature signal upon the system's temperature signal will have been reduced to a low value or to zero, so that during steady-state operation the system's feedback signal is determined substantially exclusively by the temperature signal from the passenger-compartment temperature sensor. Because only the passenger-compartment temperature signal is relied on during steady-state operation, the selected temperature will be very accurately established. Because the heat-exchanger temperature signal continues to be relied on during the system's transient response, the stability attributable to the use of a heat-exchanger temperature signal continues to be enjoyed.

According to a further concept of the invention, use is made of two independently controlled heat exchangers, for example one to condition the air entering the driver's footwell and the other the air entering the passenger's footwell in the passenger compartment of an automobile. The system includes two command transducers, each used to select a temperature for a respective zone of the passenger compartment. However, the system includes only one servo comparator. The servo comparator receives a command signal dependent upon the settings of both command transducers. The feedback signal received by the servo comparator is dependent upon a temperature signal furnished by a passenger-compartment temperature sensor, and is furthermore dependent upon the temperature signals furnished by first and second heat-exchanger temperature sensors, the latter, however, being dynamically coupled to the servo comparator for the reasons explained further above. Associated with each of the two heat exchangers is a respective one of two adjuster stages, e.g., electromagnetic valves, in turn actuated by respective ones of two actuator stages. The first and second actuator stages each receive at their inputs the same signal from the output of the servo comparator. Additionally, each actuator stage is connected to receive at its input a signal derived from a single one of the two command transducers. However, the first and second actuator stages and the first and second command transducers are cross-coupled in such a manner that if the setting of the first command transducer (used to adjust the first heat exchanger) is changed, the second actuator stage, which actuates the adjuster for the second heat exchanger but is connected to the first transducer, is not affected by the change of setting of the first command transducer, with it instead being the first actuator stage which modifies the actuator of the first adjuster stage in response to the change of first transducer setting.

In principle, it would be possible to achieve such two-zone conditioning or air temperature in the passenger compartment using two complete negative-feedback temperature controls systems, one for each of the two heat exchangers. However, in accordance with the present invention it is preferred that one passenger-compartment sensor be used for both zones, that a single servo comparator be used, and of course that the two heat-exchanger temperature sensrs be each dynamically coupled to the servo comparator (i.e., for transmission of rate-of-temperature-change information). Furthermore, with the preferred form of the two-zone passenger-compartment conditioning system of the invention, the two-zone system exhibits a greater number of degrees of freedom which are utilized to be able to maintain a sizable difference as between the temperatures of the two heat exchangers. This will become clearer from the detailed description below. However, it will be understood that if the two-zone action were to be implemented using two complete and independent temperature control systems, i.e., each having its own passenger-compartment temperature sensor, the proximity of the two zones within the small confines of a vehicle passenger compartment would tend to reduce the difference as between the temperatures sensed by the two passenger-compartment sensors and therefore, despite the nominal independence of the two systems from each other, would make it difficult to maintain two markedly different heat-exchanger temperatures.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 schematically depicts certain components of the system of FIG. 2 as installed in an automotive vehicle.

DESCRIPTION OF THE PREFERRED EMBODIMENTS

Figure 1:
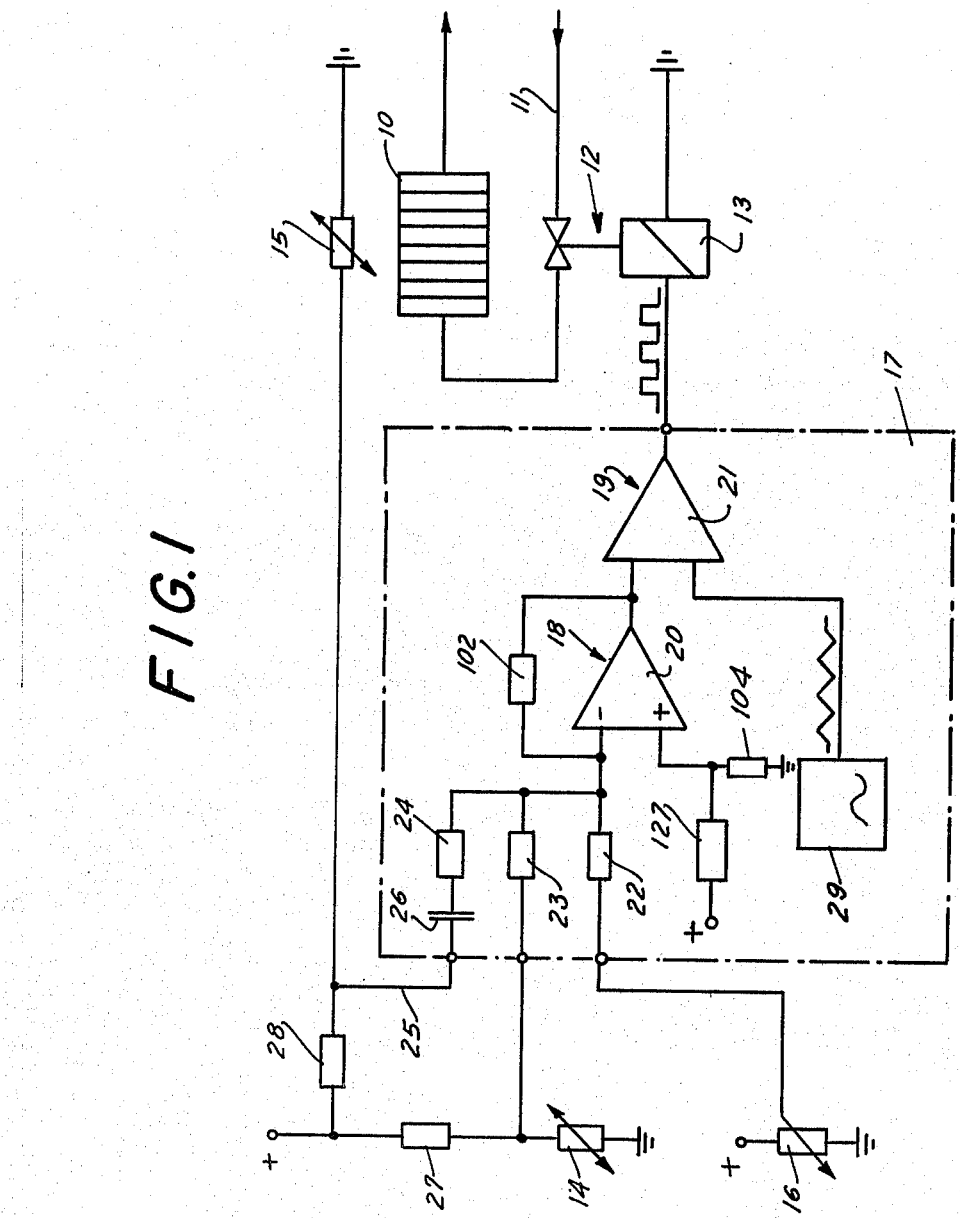
FIG. 1 depicts a first exemplary embodiment of the present invention.

FIG. 1 depicts a negative-feedback control system for controlling the temperature in the passenger compartment of a vehicle. The control system includes a heat exchanger 10 through which is passed a heat-exchanger medium, e.g., engine cooling water. Depending upon whether heating or cooling is involved, heat is exchanged between the heat-exchange medium and the ambient environment of heat exchanger 10 or a stream of air fed through or across the heat exchanger. The flow of heat-exchanger medium is schematicaly indicated at 11 in FIG. 1 and is controlled by an adjuster stage 12, e.g., an electromagnetically controlled valve provided with an electromagnet 13. Depending upon the setting of adjuster stage 12, more or less heat-exchange medium flows through heat exchanger 10.

The temperature control system furthermore includes a passenger-compartment temperature sensor 14, a heat-exchanger temperature sensor 15 which senses the temperature at or near the surface of heat exchanger 10, an adjustable command transducer 16 used to select a desired passenger-compartment temperature, and a servo controller denoted in toto by reference numeral 17. Controller 17 includes a servo comparator 18 which receives an input signal dependent upon the temperatures to which the temperature sensors 14, 15 are exposed and dependent upon the temperature to which command transducer 16 is set, and controller 17 produces an output activating signal depending upon the difference between the command passenger-compartment temperature and the actual passenger-compartment temperature. Controller 17 furthermore includes an actuating stage 19 which actuates the adjuster stage 12 in dependence upon the output signal produced by comparator 18. In the embodiment depicted in FIG. 1, comparator 18 is a difference amplifier, and in particular desired as a summing amplifier 20, whereas the actuator stage 19 is constituted by a comparator.

A comparator is a circuit which compares two signals and supplies an indication of agreement or disagreement. A difference amplifier is an amplifier consisting of two identical sections, each having at least one input terminal and the amplifier having two separate output terminals or a single output terminal common to both amplifier sections. Thus the single output signal is proportional to the algebraic difference between the two input signals. A summing amplifier is an operational amplifier producing an output signal equal to the weighted sum of the input signals.

The inverting input of the summing amplifier 20 is connected via respective ones of resistors 22, 23, 24 to the command transducer 16, to the passenger-compartment temperature sensor 14, and to the heat-exchanger temperature sensor 15. The heat exchanger temperature sensor 15 is dynamically coupled to the inverting input of summing amplifier 18 via a coupling capacitor 26 connected in the connecting line 25 from the temperature sensor 15 to the inverting input. The dynamic coupling of the heat-exchanger temperature sensor 15 renders the input signal to summing amplifier 20 dependent upon the temperature to which sensor 15 is exposed only at those times when such temperature is changing with respect to time.

The sensing element of the temperature sensor 15 is preferably a temperature sensitive resistor, which is generally called a thermistor. Such thermistors are usually made from specially processed oxides of cobalt, magnesium, manganese, nickel, uranium or mixtures of such substances. Thermistors can be employed having a positive or a negative temperature coefficient. Preferably thermistors with a negative temperature coefficient (NTC) are used. The temperature sensor 14 and 15 are here NTC resistors which are connected via respective resistors 27 and 28 to a D.C. operating voltage source, this voltage being indicated in FIG. 1 by the "+" sign and by the ground symbol.

Resistor 27 essentially provides a bias resistor for the temperature sensor 14. The voltage at the point between the bias resistor 27 and the temperature sensor 14 is fed via a resistor 23 to the inverted input of the summing amplifier 20. The resistor is chosen of such size as to match the input impedance of the summing amplifier and to prevent unnecessary loading of the resistor 27 and of the temperature sensor 14.

The command transducer 14 is here constituted by a potentiometer connected across this D.C. operating voltage source. The wiper of command potentiometer 16 is connected to the inverting input of summing amplifier 20 via a resistor 22. Resistor 22 is chosen such as to balance approximately resistor 23 such that the voltage resulting at the point between resistors 22 and 23 is approximately near the middle of the voltages at the point between the resistor 27 and the temperature sensor 14 and at the point of the wiper of the potentiometer 16 unless there is an influence coming from the heat exchanger temperature sensor via capacitor 26 and resistor 24.

The noninverted input of the summing amplifier 20 is connected to a fixed positive voltage. Preferably the fixed voltage is provided by a voltage divider circuit between the D.C. power source voltage and ground such as is shown in FIG. 1 with resistor 127 connected to the positive voltage and to the noninverted input of the summing amplifier 20 and resistor 104 connected to the non-inverted input of the summing amplifier 20 and to ground. Preferably, the voltage source for the temperature sensor 14 and for the voltage divider is the same source such that any variations in voltage of the source over time give minimized changes resulting from the variation at the inputs of the summing amplifier 20.

The ratio of the size of the resistance of the resistors 104 and 127 is selected such that the resulting input voltage of the noninverting input of the summing amplifier 20 corresponds to about the middle operating voltage between the resistor 27 and the temperature sensor 14. Preferably the ratio of the resistances of resistor 104 and 127 is from about 0.5 to 2.0 and more preferably from about 0.8 to 1.25 and a simple choice is to provide resistors 104 and 127 with about equal resistance.

The temperature setting at the command potentiometer can be experimentally calibrated with a standard thermometer while both thermometer and the temperature sensor 14 are disposed to the same temperatures. The calibration of the potentiometer 16 would in general change with changes in the sizes of any of the resistors 27, 23, 22, 104, 127.

This circuit provides that if the temperature at the temperature sensor 14 and/or the signal from the temperature change signals providing sensor 15 deviate from the set (calibrated) value at the command potentiometer 16, then the positive voltage at the inverted input of the summing amplifier 20 also deviates from the voltage provided by the voltage divider to the noninverted input of the summing amplifier 20. Depending on the sign of the deviation the polarity of the output signal of the summing amplifier 20 will vary.

A feedback resistor 102 is connected between the output of the summing amplifier 20 and the inverting input of the summing amplifier 20. The resistance of the feedback resistor 102 can be from about 300 k ohm to 910 k ohm. A purpose of the feedback resistor 102 is the adjustment of the amplification.

The output of the servo comparator 18 (summing amplifier 20) is connected to the input of the comparator 21, whose other input is connected to the output of an A.C. voltage generator 29. The latter produces a triangular output voltage waveform of constant frequency. The comparator 21 preferably has a go/no go output.

For example, if the temperature at the point of the negative temperature coefficient (NTC) resistor temperature sensor 14 is lower than the setting at the command potentiometer 16, then the resistance of the sensor at that time is higher than called for and the positive voltage at the point between temperature sensor 14 and resistor 27 is also higher and thereby the positive voltage at the inverting input of the summing amplifier 20 is also higher than the voltage coming from the voltage divider provided by resistors 104 and 127 and a negative polarity output results at the summing amplifier 20. This signal is then compared with the output of the A.C. voltage generator 29 and the output signal of the comparator will provide for heat input to the vehicle as pulses or, if necessary, in a continuous way with the elements described in the following.

The output of comparator 21 is connected to the electrical input of adjuster stage 12; if adjuster stage 12 is an electromagnetically controlled valve, the output voltage of comparator 21 is applied to one terminal of the energizing winding of the valve's electromagnet 13, the other terminal of which is as shown connected to ground.

The illustrated negative-feedback temperature control system operates as follows:

Depending upon the amount by which the feedback signal of the system, determined by the output signal of passenger-compartment temperature sensor 14 and the change with respect to time, if any, of the signal from the heat-exchanger temperature sensor 15, deviates from the output signal from command transducer 16, there develops at the output of summing amplifier 20 a voltage which is proportional to the amount of the temperature deviation or system error, controller 17 operating as a proportional controller in this embodiment. The output signal from summing amplifier 20 and the triangular voltage from voltage generator 29 are combined by comparator 21 to produce a rectangular output waveform whose frequency is the same as the constant frequency of voltage generator 29 but whose pulse-duration/interpulse duration ratio varies in dependence upon the output voltage of summing amplifier 20. Preferably the comparator 21 is a go/no go comparator with a one output if the sum of the input signals is of one polarity and with a zero output if the sum of the input signals is of the other polarity. In dependence upon the output pulse train from from comparator 21, adjuster stage 12 is actuated either to assume its on setting or its off setting, the relative durations of its on and off settings being determined by the amount of the system error. As a result, the amount of heat exchange medium flowing through the heat exchanger 10 is very precisely dosed.

The voltage developed at the output of summing amplifier 20 is:

$$U_{20} = V_{14}(\theta_{16} - \theta_{14}) - \frac{V_{15} \cdot pR_{24}C_{26}}{1 + pR_{24}C_{26}} \Delta\theta_{15} \quad (1)$$

wherein:

$U_{20}$ = the output voltage of summing amplifier 20, $V_{14}$ = the proportionality factor between the temperature at the passenger-compartment temperature sensor 14 and the resulting voltage developed at the output of the summing amplifier 20, $V_{15}$ = a proportionality factor between the rate of the temperature change at the heat exchanger temperature sensor 15 and the resulting voltage at the output of summing amplifier 20, $\theta_{14}$ = the temperature of sensor 14, expressed in °K.

$\Delta\theta_{15}$ = the rate of the change of the surface temperature of the heat exchanger 10, expressed in °K. per time unit, $\theta_{16}$ = the command temperature, expressed in °K., $R_{24} \cdot C_{26}$ = the time constant of resistor 24 and coupling capacitor 26, and $p = jw = j\,25f$ the formula shows that the voltage only depends on the range of change in temperature $\theta$ 15.

As the command temperature setting can be calibrated with the temperature sensor 14 and a thermometer, the absolute value of the proportionality factor relating to the command temperature sensor 16 is numerically equal to $V_{14}$.

In the exemplary embodiment of FIG. 1, the coupling time constant $R_{24} \cdot C_{26}$ amounts to about 30 seconds.

From the above equation (1) it will be seen that, in steady state operation, only the passenger-compartment temperature makes itself felt in the output voltage of summing amplifier 20, the effect of the heat exchanger temperature dropping out as steady-state operation sets in. Accordingly, in steady-state operation, controller 17 detects only the temperature sensed by passenger-compartment temperature sensor 14 and operates to bring this temperature into equality with the temperature commanded by means of command transducer 16.

By appropriate dimensioning of the triangular voltage waveform produced by voltage generator 29, it is possible to establish a sufficiently wide range within which the temperature control system will operate in proportional fashion. If the output voltage of summing amplifier 20 persists at a value in excess of the maximum or below the minimum magnitude of the triangular voltage waveform, then the output voltage of comparator 21 will no longer be a pulse train but instead will persist at on level or at off level.

Accordingly, if the feedback temperature is greatly below the commanded temperature, adjuster stage 12 will persist in its on setting, establishing a maximum flow of heat-exchange medium 11 through heat exchanger 10, whereas if the feedback temperature is greatly above the commanded temperature, adjuster stage 12 will persist in its off setting, interrupting the flow of heat-exchange medium through the heat exchanger.

Figure 2:
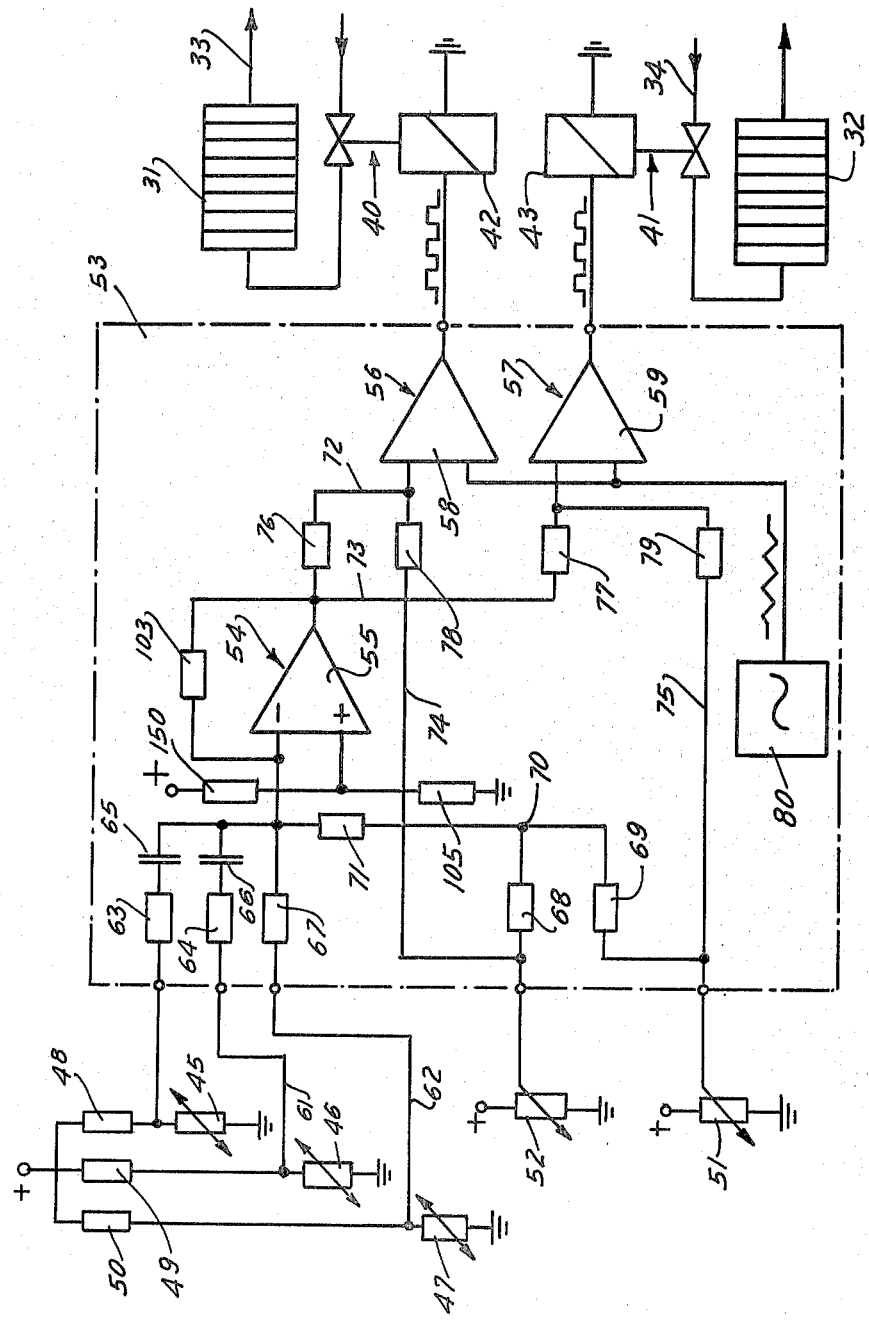
FIG. 2 depicts a second exemplary embodiment of the invention.

FIGS. 2 and 3 depict a second temperature control system embodying the invention, here operative for heating the air in a vehicle passenger compartment. The system includes two heat exchangers 31, 32, through each of which heating medium, e.g., engine cooling water, flows. The heating-medium circuit for heat exchanger 31 is denoted by numeral 33 and that for heat exchanger 32 by numeral 34. The flow directions are indicated by the arrows. As shown in FIG. 3, a flow of air, established by fans 36, 37 or merely entering the vehicle due to vehicle travel, is passed over the heat exchangers 31, 32 and enters via inlet passages 38, 39 into the vehicle passenger compartment 30, preferably at foot level in the driver's part 301 and the passenger's part 302 of the passenger compartment.

The heat-exchange medium circuits 33, 34 are each provided with a respective adjuster stage 40, 41, here again preferably in the form of electromagnetically controlled valves provided with respective control electromagnets 42, 43. Numeral 44 denotes the engine of the vehicle.

The system furthermore includes two heat-exchanger temperature sensors 45, 46, each located to sense the temperature at or near the surface of a respective one of heat exchangers 31, 32. The system includes only one passenger-compartment temperature sensor 47, preferably located to sense the temperature at head level within the passenger compartment. As indicated, the temperature sensors 45, 46, 47 are NTC resistors, each connected via a respective one of resistors 48, 49, 50 to a D.C. operating voltage source indicated by the "+" sign and the ground symbol. Alternatively, for example, the temperature sensors 45-47 could be silicon diodes. The control system includes two command transducers 51, 52 each associated with a single one of the two heat-exchangers 31, 32 and manually adjustable for separately controlling the flow of heat-exchange medium through each of the two heat-exchangers. This means that the surface temperature of one heat exchanger may differ from that of the other during steady-state operation of the heating system, for example if the driver wishes warmer or less warm air to blow onto his feet than is desired by his accompanying passenger, the driver and his passenger each have convenient access to a respective one of the temperature command transducers 51, 52.

The controller 53 of this embodiment comprises only a single servo comparator 54, here as in the previous embodiment a difference amplifier, and in particular a summing amplifier 55. The controller 53 furthermore comprises two actuator stages 56, 57 each serving to vary the temperature of a respective one of the two heat exchangers 31, 32, and in particular each controlling a respective one of the two adjuster stages 40, 41. In this embodiment, the actuator stages 56, 57 are essentially comprised of respective comparators 58 and 59.

The output signal of actuator stage 56 (comparator 58) controls adjuster stage 40 for heat exchanger 31; the output signal of actuator stage 57 (comparator 59) controls adjuster stage 41 for heat exchanger 32. The two heat-exchanger temperature sensors 45 and 46 are dynamically coupled to the inverting input of summing amplifier 55 via respective connecting lines 60 and 61 which include respective coupling capacitors 65 and 66 and respective resistors 63 and 64. The passenger-compartment temperature sensor 47 is statically coupled to the inverting input of summing amplifier 55 via a connecting line 62 which includes a resistor 67.

The temperature command transducers 51, 52 are connected to the inverting input of summing amplifier 55, in such a manner that the input voltage received by the inverting input and attributable to the command transducers is equal to one half the sum (i.e., the average) of the output voltages furnished by the two command transducers 51, 52. To this end, the wipers of the potentiometers 51, 52 are each connected to one terminal of a respective one of two resistors 68, 69, whose other terminals are connected in common at 70 and via a further resistor 71 connected to the inverting input of summing amplifier 55.

Corresponding to the circuit of FIG. 1, here again the noninverted input of the summing amplifier 55 is connected to a fixed positive voltage. Preferably the fixed voltage is provided by a voltage divider between the D.C. power source voltage and ground such as shown in FIG. 2 with resistor 150 connected to the positive voltage pole and to the noninverted input of the summing amplifier 55 and resistor 105 connected to the noninverted input of the summing amplifier and to ground. Preferably, the voltage source for the temperature sensing element and for the voltage divider is the same source such that any variations in voltage minimize changes resulting from such variations at the inputs of the summing amplifier 55. The ratio of the resistances of the resistors 105 and 150 is selected such that the resulting input voltage of the noninverting input of the summing amplifier 55 corresponds to about middle operating voltage between the resistor 50 and the temperature sensor 47. Preferably the ratio of the resistances of the resistors 105 and 150 is from about 0.5 to 2.0 and more preferably from about 0.8 to 1.25 and a simple choice is to provide the resistors 105 and 150 with about equal resistance.

As will become clearer below, temperature command transducer 51, although connected to the input of comparator 59, is used to vary the output signal produced by comparator 58. Likewise, temperature command transducer 52, although connected to the input of comparator 58, is used to vary the output signal produced by comparator 59. Accordingly, the setting of command transducer 51 has an effect on the operation of heat exchanger 31, whereas the setting of command transducer 52 has an effect on the operation of heat exchanger 32. This will now be explained.

The upper inputs of comparators 58 and 59 are connected to the output of summing amplifier 55 via respective connecting lines 72 and 73 which include respective resistors 76 and 77. The output of the summing amplifier 55 is furthermore connected via the feedback resistor 103 to the inverting input of the summing amplifier 55. The upper input of comparator 58 is furthermore connected to the wiper of command potentiometer 52 via a connecting line 74 which includes a resistor 78. The upper input of comparator 59 is furthermore connected to the wiper of command potentiometer 51 via a connecting line 75 which includes a resistor 79.

The resistance values of resistors 76, 77, 78, 79 are so selected that, if the setting of potentiometer 52 is changed but not that of potentiometer 51, the signal applied to the upper input of comparator 59 remains unchanged whereas the signal applied to the upper input of comparator 58 changes in accordance with the change in potentiometer setting. Likewise, if the setting of potentiometer 51 is changed but not that of potentiometer 52, the signal applied to the upper input of comparator 58 remains unchanged whereas the signal applied to the upper input of comparator 59 changes in accordance with the change of setting of potentiometer 51.

It will be appreciated that the signal applied to the upper input of comparator 58 serves to define the threshold level of that comparator, and that the signal applied to the upper input of comparator 59 serves to define the threshold level of comparator 59, i.e., relative to whether and for what time intervals the triangular voltage waveform from source 80 will exceed such comparator threshold level.

The threshold-determining voltage $U_S$ applied to the upper input of either comparator 48, 59, in the illustrated embodiment, is $$U_S = U_{55}(1-q) + q \cdot U_{nominal} \qquad (2)$$

wherein:

$U_{55}$ = the output voltage of summing amplifier 55, $U_{nominal}$ = the output voltage of potentiometer 51 in the case of comparator 58, or else the output voltage of potentiometer 52 in the case of comparator 59.

q = the ratio of the resistances of resistors 76 and 78, and of resistors 77 and 79.

q is so selected that when only one of potentiometers 51, 52 changes in setting, one component of the signal at the upper input of the comparator connected to that potentiometer changes in value due to the change of the output voltage of summing amplifier 55, but with another component of that same signal cancelling out the just mentioned change of the first signal component.

I.e., for comparator 58, the voltage $U_{S58}$ at its upper input is $$U_{S58} = U_{55}(1-q) + q \cdot U_{52} \qquad (3)$$

wherein:

$U_{55}$ = the output voltage of summing amplifier 55

$U_{52}$ = the voltage at the wiper of command potentiometer 52, and q = the ratio of resistance values as between resistors 76 and 78.

As will be seen from equation (3), the voltage $U_{S58}$ at the upper, or threshold-defining input of comparator 58 consists of two components, the first component determined by the output voltage of summing amplifier 55, and the second determined by the wiper voltage of command potentiometer 52. If the setting of potentiometer 51 is kept unchanged and the setting of potentiometer 52 is changed, the first component of $U_{S58}$ changes, inasmuch as the output voltage $U_{55}$ of summing amplifier 55 is determined by one half the sum of the wiper voltages of potentiometers 51 and 52. However, with q properly selected, the second component of $U_{S58}$, directly proportional to the wiper voltage of potentiometer 52, changes in an opposite direction and by a substantially equal amount, so that the comparator input voltage $U_{S58}$ remains unchanged.

Similarly, for comparator 59, the voltage $U_{S59}$ at its upper input is $$U_{S59} = U_{55}(1-q) + q \cdot U_{51} \qquad (4)$$

wherein $U_{55}$ = the output voltage of summing amplifier 55,
$U_{51}$ = the wiper voltage of potentiometer 51, and
q = the ratio of resistance values as between resistors 77 and 79.

The system of FIGS. 2 and 3 operates as follows:

The system's command voltage, applied to the inverting input of summing amplifier 55 via input resistor 71, is determined by the average (one half the sum) of the wiper voltages of the two command potentiometers 51, 52. The system's steady-state feedback voltage, applied to the inverting input of summing amplifier 55 via input resistor 67, is determined by the voltage developed by passenger-compartment temperature sensor 47. The system's transient or dynamic component of feedback voltage, applied to the inverting input of summing amplifier 55 via the high-pass filters 63, 65, 64, 66 is determined by the sum of the rate of change (if non-zero) of the output signal from heat-exchanger temperature sensor 45 and the rate of change (if non-zero) of the output signal from heat-exchanger temperature sensor 46. The output voltage $U_{55}$ produced by summing amplifier 55 corresponds to the difference between the aforementioned command voltage and the aforementioned feedback voltage, the feedback voltage including the aforementioned transient feedback-voltage component during transitions from one steady-state condition to another. In accordance with equations (3) and (4) above, the threshold-defining signal at the upper inputs of comparators 58 and 59 are determined by the output voltage $U_{55}$ of summing amplifier 55 and the wiper voltage of potentiometer 51 (in the case of comparator 59) or of potentiometer 52 (in the case of comparator 58). If the two command transducers 51, 52 happen to be set to identical temperature settings, then the threshold voltage levels set at the upper inputs of the two comparators 58, 59 will be equal to each other. With regard to each of comparators 58, 59 considered individually, the processing of the triangular voltage waveform from voltage source 80 is the same as described above with regard to FIG. 1, each comparator producing at its output a pulse train whose repetition frequency equals the constant frequency of the triangular waveform but with a pulse-duration/interpulse-duration ratio which varies in dependence upon system error. The comparator output pulse trains activate the adjuster stages 40 and 41 in the same manner as described with regard to FIG. 1.

So long as the command potentiometers 51, 52 are set to identical temperature settings, the adjuster stages 40 and 41 stay in indentical settings, as a result of which the flow of heat-exchange medium through the two heat exchangers 31, 32 is the same in both heat exchangers, the temperatures of heated air entering the driver's side and the passenger's side at footwell level being equal to each other.

Assume now that the temperature setting of command potentiometer 52 is left unchanged, but that potentiometer 51 is now changed to a different setting, e.g., for a higher temperature. This results in an increase of the command voltage applied via input resistor 71 to the inverting input of summing amplifier 55, by an amount corresponding to one half the amount by which the wiper voltage of potentiometer 51 has just been increased. As a result, the output voltage $U_{55}$ of summing amplifier 55 increases. As explained above with regard to equations (2) to (4), the first component of the threshold-defining voltage applied to the upper input of each comparator 58, 59 (this first component originating at the output of amplifier 55) now increases. The second component of the voltage applied to the upper input of comparator 59 (originating from the wiper voltage of potentiometer 51), however, undergoes a decrease opposite in polarity but of magnitude equal to the increase of the first component, with the result that the voltage at the upper input of comparator 59 does not change in response to the change of setting of potentiometer 51.

In contrast, the second component of the voltage at the upper input of comparator 58 is determined by the setting of potentiometer 52, not potentiometer 51. Accordingly, with the setting of potentiometer 52 unchanged, the second component of the upper-input input voltage of comparator 58 does not change and thus does not offset the increase in the first component of this input voltage (corresponding to the increase in the output voltage of summing amplifier 55). Thus, as a result of the change of setting of potentiometer 51, the threshold level of comparator 59 does not initially change, whereas the threshold level of comparator 58 initially increases by the amount of the increase of the output voltage of summing amplifier 55. As a result of the increased threshold level of comparator 58, the fraction of a period during which the triangular voltage from voltage generator 80 exceeds the threshold level of comparator 58 changes, resulting in a change of the pulse-duration/interpulse-duration ratio of the output pulse train from comparator 58, and thus resulting in a change of setting of adjuster stage 40 and a corrective increase in the flow of heat-exchange medium through heat exchanger 31. This in turn leads to an increase in the surface temperature of heat exchanger 31 and thus to the desired increase in the temperature of the heated air blown through passage 38.

Similarly, if the two command potentiometer 51, 52 are initially in identical settings but then the setting of potentiometer 52 is changed, the pulse-duration/interpulse duration ratio of the output pulse train of comparator 59 is altered, and the setting of adjuster stage 41 changes to increase or decrease the flow of heat-exchanged medium through heat exchanger 32, depending upon whether command potentiometer 52 has been set to a higher or to a lower setting.

It will be understood that each of the elements described above, or two or more together, may also find a useful application in other types of circuits and constructions differing from the types described above.

While the invention has been illustrated and described as embodied in climate-control systems where passenger-compartment temperature is varied by varying flow of heat-exchange medium through heat exchangers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A negative-feedback temperature control system for conditioning the temperature of air in the passenger compartment of a vehicle, comprising, in combination,
heat exchanger means located to exchange heat with air entering the passenger compartment;
adjusting means for adjusting the flow of heat-exchange fluid flowing through the heat exchanger means;
passenger-compartment temperature sensing means for sensing the temperature inside the passenger compartment,
heat-exchanger temperature sensing means for sensing the temperature at or near the surface of the heat exchanger means;
adjustable command transducer means operable for selecting a passenger-compartment temperature;
servo comparator means operative for receiving feedback and command signals and producing an error signal;
actuating means connected to the adjusting means for actuating the latter and connected to the servo comparator means for receipt of a signal dependent upon the error signal;
means connected to the command transducer means and to the servo comparator means for applying to the latter a command signal derived from the command transducer means; and
means applying to the servo comparator means a feedback signal derived from the passenger-compartment temperature sensing means and the heat-exchanger temperature sensing means, including means applying to the servo comparator means a signal whose value depends upon the rate of change with respect to time of the temperature sensed by the heat-exchanger temperature sensing means.

2. The temperature control system defined in claim 1, the servo comparator means comprising a difference amplifier having an output connected to the actuator means and having an input connected to receive a signal from the passenger-compartment temperature sensing means, the heat exchanger temperature sensing means being connected to the servo comparator means for applying a signal whose value depends upon the rate of change of the temperature sensed by the heat-exchanger temperature sensing means including a coupling capacitor coupling the heat-exchanger temperature sensing means to the input of the difference amplifier for transmitting to the latter a signal whose value is dependent upon the rate of change with respect to time of the temperature sensed by the heat-exchanger temperature sensing means.

3. The temperature control system defined in claim 2, the difference amplifier comprising a summing amplifier having an inverting input and a non-inverting input, the means applying the command signal applying the command signal to the inverting input, further comprising means providing a feedback signal where the feedback signal is applied to the inverting input.

4. The temperature control system defined in claim 1, the actuator means comprising a comparator having an input connected to the servo comparator means for receipt of a signal dependent upon the error signal and determinative of the threshold level of the comparator and means applying to the input of the comparator a repetitive voltage of increasing and decreasing magnitude.

5. The temperature control system defined in claim 1,
the heat exchanger means comprising first and second heat exchangers,
the adjusting means comprising first and second adjuster devices for adjusting the flow of heat-exchange fluid through the first and second heat exchangers, respectively,
the heat-exchanger temperature sensing means comprising first and second heat-exchanger temperature sensors respectively operative for sensing the temperature at the first and at the second heat exchanger,
the adjustable command transducer means comprising first and second adjustable command transducers respectively operable for selecting a first temperature, and a second temperature,
the actuating means comprising first and second actuators respectively connected to the first and second adjuster devices for actuating the latter and each connected to the servo comparator means for receipt of a signal dependent upon the error signal,
the means applying the command signal comprising means operative for applying to the servo comparator means a command signal derived from the first and second command transducers,
the means applying a signal whose value depends upon the rate of change of the temperature sensed by the heat-exchanger temperature-sensing means comprising means for applying to the servo comparator means a signal whose value is dependent upon the rate of change of the temperature sensed by the first heat-exchanger temperature sensor and also dependent upon the rate of change of the temperature sensed by the second heat-exchanger temperature sensor,
furthermore including means coupling the first command transducer to the second actuator and the second command transducer to the first actuator such that changes in the setting of the first command transducer have substantially no effect upon the second actuator and such that changes in the setting of the second command transducer have substantially no effect upon the first actuator.

6. The temperature control system defined in claim 5, the means coupling the first and second command transducers to the first and second actuators comprising means coupling the first command transducer to the second actuator such that if the setting of the first but not the second command transducer is changed the effect upon the second actuator of the resulting change in the error signal is offset by a signal derived from the first command transducer itself, and likewise coupling the second command transducer to the first actuator such that if the setting of the second but not the first command transducer is changed the effect upon the first actuator of the resulting change in the error signal is offset by a signal derived from the second command transducer itself.

7. The temperature control system defined in claim 6, the means applying the command signal comprising means applying to the servo comparator means a command signal corresponding to the average of the temperature selected by means of the first command transducer and the temperature selected by means of the second command transducer.

8. The temperature control system defined in claim 5, the first and second actuators respectively comprising first and second comparators each having a first input for receipt of a signal establishing the threshold level of the comparator and a second input, and furthermore including means applying to the second input of each comparator a repetitive signal which increases and decreases in magnitude, furthermore including two resistors respective ones of which connect the first input of the first comparator and the first input of the second comparator to the servo comparator means for receipt of the error signal, and two further resistors respective ones of which connect the first input of the first comparator to the second command transducer and the first input of the second comparator to the first command transducer, the resistance values of said resistors being dimensioned such that if the setting of the first but not the second command transducer is changed the effect of the resulting change in the error signal upon the threshold level of the second comparator is offset by a signal derived from the first command transducer itself, and likewise such that if the setting of the second but not the first command transducer is changed the effect of the resulting change in the error signal upon the threshold level of the first comparator is offset by a signal derived from the second command transducer itself.

9. The temperature control system defined in claim 5, the first and second heat exchangers being located to exchange heat with air entering different respective zones of the passenger compartment.

10. The temperature control system defined in claim 9, one zone being the footwell of the driver and the other zone being the footwell of the accompanying passenger.

11. The temperature control system defined in claim 2 wherein a second input of the difference amplifier is connected to a voltage divider for providing an appropriate reference voltage to the serve comparator.

* * * * *